(12) United States Patent
Nakata et al.

(10) Patent No.: US 8,220,495 B2
(45) Date of Patent: Jul. 17, 2012

(54) FLUID CONTROL APPARATUS AND METHOD FOR ASSEMBLING THE SAME

(75) Inventors: Tomohiro Nakata, Osaka (JP);
Tsutomu Shinohara, Osaka (JP);
Michio Yamaji, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 417 days.

(21) Appl. No.: 12/451,643

(22) PCT Filed: May 26, 2008

(86) PCT No.: PCT/JP2008/059632
§ 371 (c)(1),
(2), (4) Date: Nov. 23, 2009

(87) PCT Pub. No.: WO2008/146779
PCT Pub. Date: Dec. 4, 2008

(65) Prior Publication Data
US 2010/0132808 A1    Jun. 3, 2010

(30) Foreign Application Priority Data
May 31, 2007    (JP) .................................. 2007-144927

(51) Int. Cl.
*F16K 11/10* (2006.01)
(52) U.S. Cl. ....................................... 137/884
(58) Field of Classification Search ................. 137/269, 137/271, 884
See application file for complete search history.

(56) References Cited

U.S. PATENT DOCUMENTS

| | | | | |
|---|---|---|---|---|
| 3,654,960 A | * | 4/1972 | Kiernan | 137/884 |
| 3,756,274 A | * | 9/1973 | Wolfgramm | 137/561 R |
| 4,136,713 A | * | 1/1979 | Humphreys | 137/561 A |
| 6,874,537 B2 | * | 4/2005 | Hayashi et al. | 137/884 |
| 6,892,763 B2 | * | 5/2005 | Burkhardt et al. | 137/884 |
| 6,951,226 B2 | * | 10/2005 | Eriksson et al. | 137/884 |
| 7,464,726 B2 | * | 12/2008 | Mertes et al. | 137/884 |

FOREIGN PATENT DOCUMENTS

| | | |
|---|---|---|
| JP | 50-086322 | 7/1975 |
| JP | 51-70978 | 6/1976 |
| JP | 3-95053 | 9/1991 |
| JP | 5-47646 | 6/1993 |
| JP | 10-227368 A | 8/1998 |
| JP | 2002-346814 | 12/2002 |

OTHER PUBLICATIONS

International Search Report dated Jul. 8, 2008, issued on PCT/JP2008/059632.

* cited by examiner

*Primary Examiner* — John Fox
(74) *Attorney, Agent, or Firm* — Edwards Wildman Palmer LLP

(57) ABSTRACT

There is provided a fluid control apparatus which can improve assembling operation efficiency. A screw insertion hole 29 extending in a front and rear direction have a stepped portion 29a which receives a head portion 18a of a male screw member 18, and the stepped portion 29a is positioned at a position closer to an inserted tip end side of a male screw member 28 in the front and rear direction than a position, in the front and rear direction, of male screw members 34 from above. By fastening the male screw member 18 in the front and rear direction at first and then fastening the male screw member 34 from above, it is possible to prevent the male screw member 18 in the front and rear direction and the male screw member 34 from above from interfering with each other.

2 Claims, 4 Drawing Sheets

FLUID CONTROL APPARATUS AND METHOD FOR ASSEMBLING THE SAME

TECHNICAL FIELD

The present invention relates to a fluid control apparatus used in a semiconductor manufacturing apparatus and the like and, more particularly, relates to a fluid control apparatus formed by integrating a plurality of fluid control devices with one another and a method for assembling the same.

BACKGROUND ART

In a fluid control apparatus used in a semiconductor manufacturing apparatus, there has been advanced integration for arranging a plurality of fluid control devices in series and connecting the devices to one another without interposing pipes and joints thereamong for forming and installing a plurality of lines in parallel with one another on a base member. As such a fluid control apparatus, Patent Document 1 discloses a fluid control apparatus which includes a plurality of block-shaped joint members that form a lower-stage layer and are mounted to a base member through male screw members and which further includes a plurality of fluid control devices that form an upper-stage layer and are mounted to straddle joint members adjacent to each other.

Patent Document 1: Japanese Unexamined Patent Publication No. 10-227368

DISCLOSURE OF THE INVENTION

Problems to be Solved by the Invention

The fluid control apparatus in Patent Document 1 has an advantage that space occupied by the apparatus and volumes of flow channels can be reduced in comparison with conventional apparatuses, but has had a problem of necessity of time and efforts for positioning the fluid control devices when mounting the devices so as to straddle adjacent joint members.

It is an object of the present invention to provide a fluid control apparatus which enables increasing assembling operation efficiency and a method for assembling the same.

Means for Solving the Problems

A fluid control apparatus according to the present invention includes a plurality of fluid control devices arranged side by side in a front and rear direction; a plurality of block-shaped joint members which are integrated with or separated from the fluid control devices; and seal means for ensuring sealing property at a portion where the joint members are abutted against one another, wherein each of the joint members is mounted to a base member through a male screw member from above, the joint members are abutted against one another and coupled to one another through a male screw member in the front and rear direction, a screw insertion hole extending in the front and rear direction has a stepped portion for receiving a head portion of the male screw member, and the stepped portion is provided closer to an inserted tip end of the male screw member in the front and rear direction than a position, in the front and rear direction, of the male screw members from above.

Each joint member is mounted to the base member at its center portion in the front and rear direction, for example. The joint members are sequentially coupled to one another, through the male screw members in the front and rear direction. The fluid control devices are integrated with the joint members in advance or, otherwise, are coupled to the joint members through the male screw members from above. This can eliminate the necessity of arranging the fluid control devices so as to straddle the joint members adjacent to each other and, also, can provide fluid flow channels capable of flowing a fluid linearly, in comparison with fluid flow channels used in the aforementioned arrangement. Further, the male screw members in the front and rear direction are arranged at two positions spaced part from each other by 180 degrees out of the four corners of the rectangular shape, and the screw insertion holes and female screws are alternately provided at the four corners of one joint member, while the screw insertion holes and male screws are alternately provided at the four corners of the other joint member at the positions opposite from those in the one joint member. Thereby, the pair of joint members can be coupled to each other through two male screw members. As a result, the weight is reduced, the number of joint members is easily increased or decreased, and the assembling operation efficiency is also increased. Furthermore, the seal means is provided substantially at the center of the rectangular abutting surfaces of joint members adjacent to each other (just at the center in the widthwise direction, and the position thereof in the upward and downward directions can be properly changed according to the necessity of aligning with the adjacent joint members), which enables coupling them using two male screw members, thereby ensuring sealing property without employing four male screw members.

With the aforementioned structure, by fastening the male screw members in the front and rear direction at first and then fastening the male screw members from above, it is possible to prevent the male screw members in the front and rear direction and the male screw members from above from interfering with each other.

A method for assembling a fluid control apparatus according to the present invention is a method for assembling a fluid control apparatus including a plurality of fluid control devices arranged side by side in a front and rear direction, a plurality of block-shaped joint members which are integrated with or separated from the fluid control devices, and seal means for ensuring sealing property at a portion where the joint members are abutted against one another, the method including the steps of: mounting each of the joint members to a base member through a male screw member from above; and coupling the joint members abutted against one another through a male screw member in the front and rear direction; wherein the male screw member in the front and rear direction is fastened at first, and then the male screw member from above is fastened, in order to prevent the male screw member in the front and rear direction and the male screw member from above from interfering with each other.

In the present specification, the terms "upper" and "lower" refer to upper and lower sides in FIG. 1, and the terms "front" and "rear" refer to front and rear sides in FIG. 1. It should be noted that the terms "upper", "lower", "front" and "rear" are merely for convenience and, for example, the arrangement can be made such that the left and right sides in FIG. 1 exist in the upper and lower sides, and the terms "upper", "lower", "front" and "rear" are not coincident with the upper, lower, front and rear sides at the time of installation.

The fluid control devices include shut-off valves, a pressure reducing valve, a filter, a pressure indicator, a flow-rate adjustment device (a mass flow controller). Each fluid control device is constituted by a functional portion which incorporates a structure for performing an opening/closing function, a flow-rate adjusting function and the like, and a main body portion which is provided integrally with the functional portion and is provided with a fluid flow channel therein and, in this case, the main body portion forms a block-shaped joint portion (which is included in a "block-shaped joint member"). Further, a fluid control device may be supported by a block-shaped joint member separated from a main body portion.

The seal means includes a gasket interposed between joint members and annular gasket-pressing protrusions formed on the abutting surfaces of the joint members, and is adapted to ensure sealing property by deforming the gasket by the annular gasket-pressing protrusions.

The male screw members are preferably made of a stainless steel (SUS304, SUS316 and the like), and the joint members are also preferably made of a stainless steel (SUS304, SUS316 and the like). The gaskets are preferably formed to have an annular shape (a disk shape with a hole) made of a stainless steel, a nickel alloy and the like.

Effects of the Invention

With the fluid control apparatus and the method for assembling the same, according to the present invention, it is possible to sequentially couple block-shaped joint members aligned in a front and rear direction through male screw members in the front and rear direction, which prevents the male screw members in the front and rear direction and the male screw members from above from interfering with each other, thereby improving assembliability.

Figure 1:
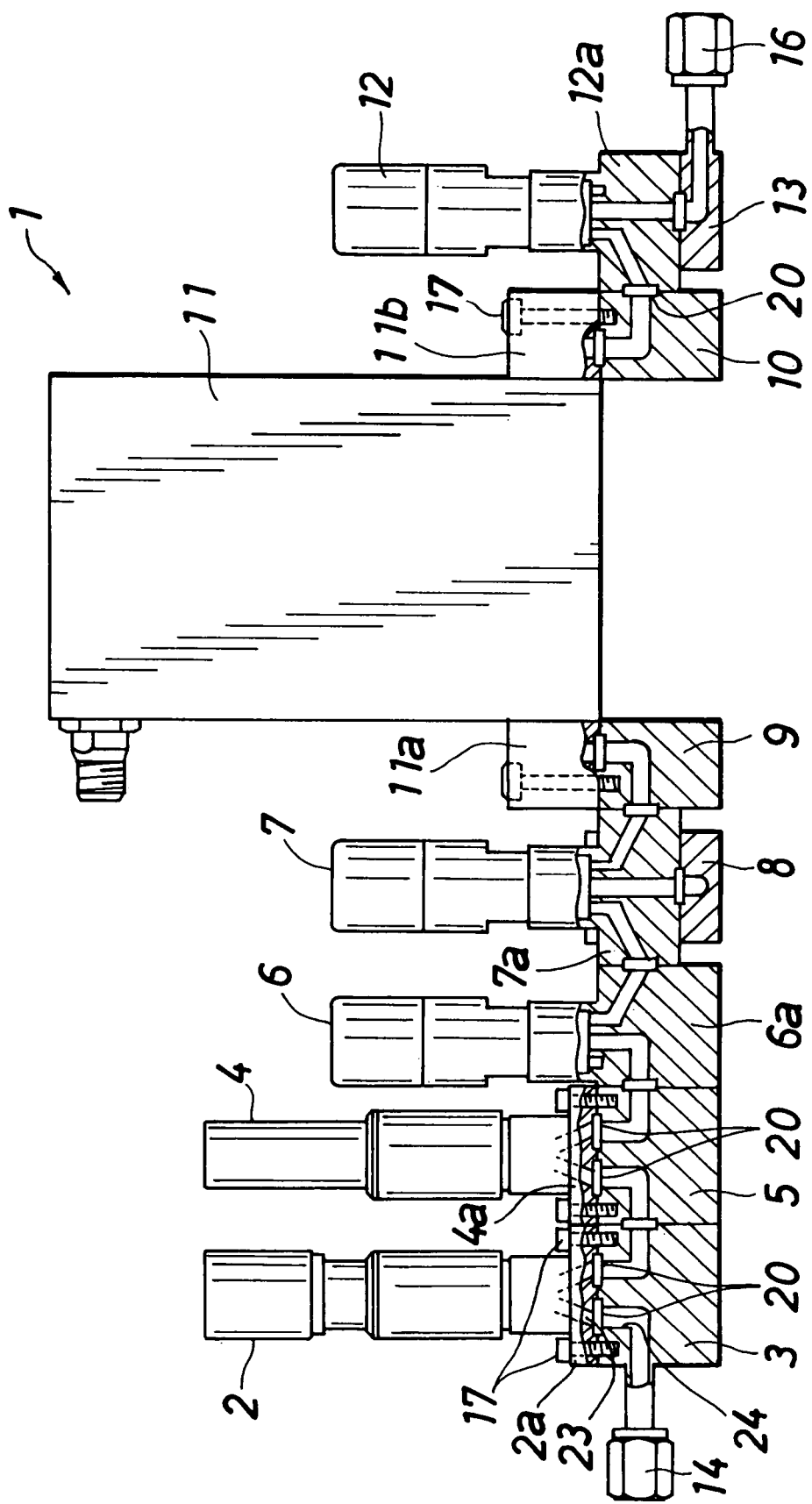
FIG. 1 is a longitudinal cross-sectional view illustrating a first embodiment of a fluid control apparatus according to the present invention.

DESCRIPTION OF THE REFERENCE NUMERALS (1) Fluid control apparatus
(2) Pressure reducing valve (fluid control device)
(3), (5), (9), (10) Block-shaped joint member
(4) Pressure indicator (fluid control device)
(6), (7), (12) Shut-off valve (fluid control device)
(6a), (7a), (12a) Block-shaped joint portion (block-shaped joint member)
(11) Flow-rate adjustment device (fluid control device)
(18) Male screw member in front and rear direction
(20) Seal portion (seal means)
(29) Screw insertion hole
(30) Female screw
(31) Base member
(33) Screw insertion hole
(34) Male screw member from above (joint-member mounting male screw member)

BEST MODE FOR CARRYING OUT THE INVENTION

Hereinafter, an embodiment of the present invention will be described with reference to the drawings.

Figure 2:
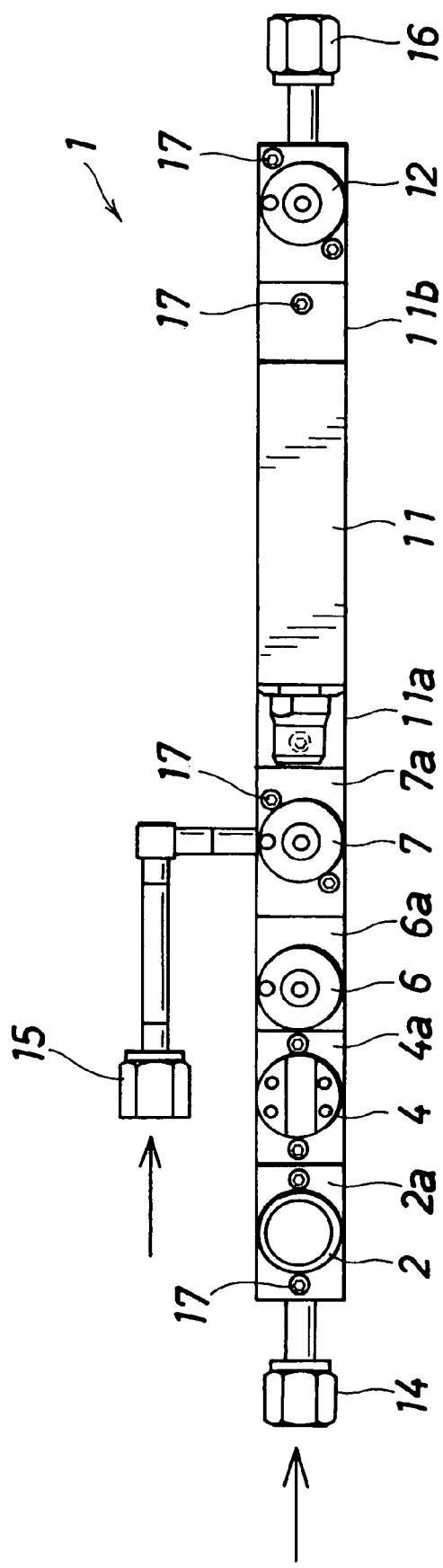
FIG. 2 is a plan view of the same.
Figure 3:
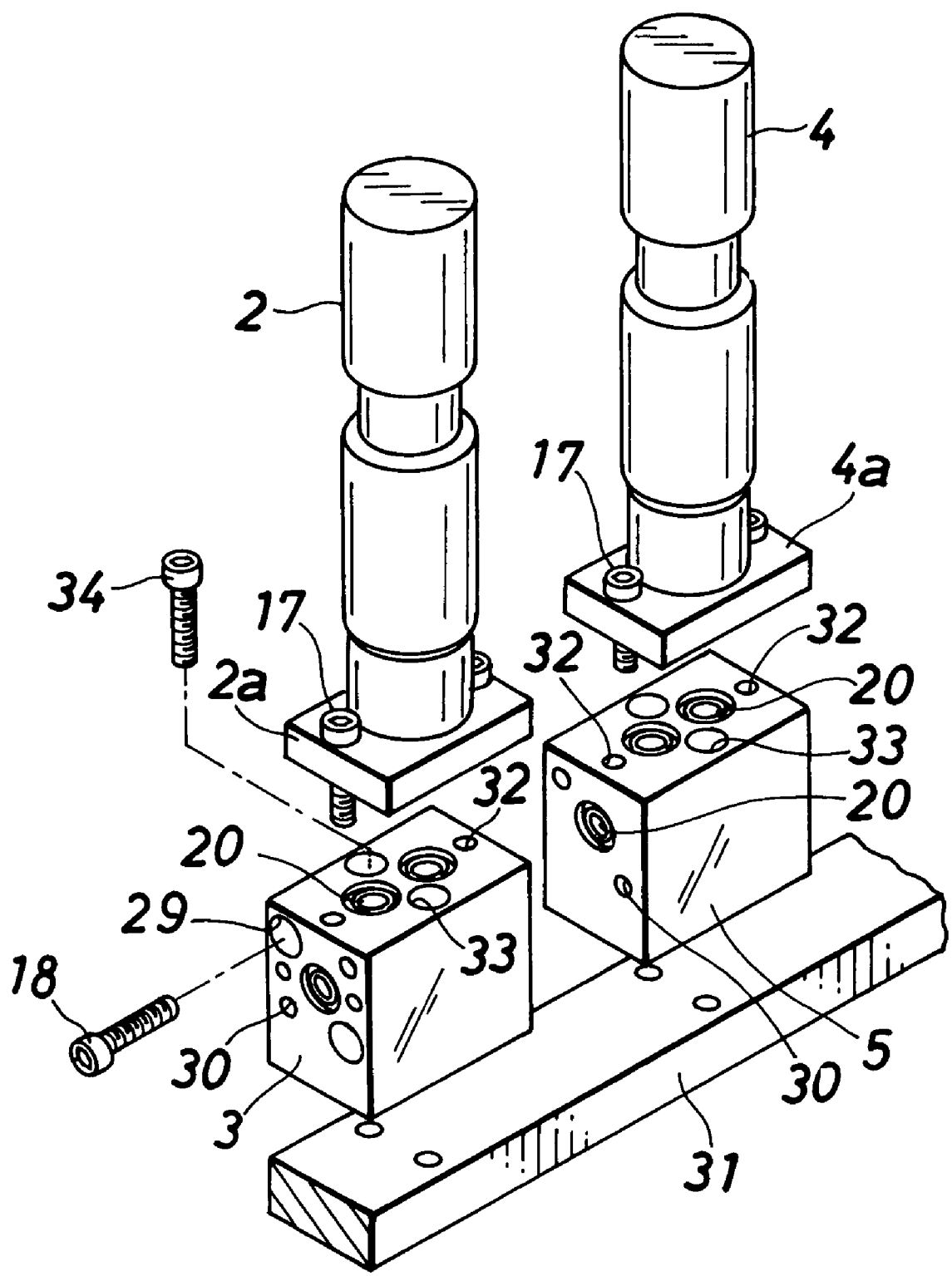
FIG. 3 is an enlarged exploded perspective view of main parts of the same.

FIGS. 1 to 3 illustrate a first embodiment of a fluid control apparatus according to the present invention. In FIG. 1, an outlet side is at the right, and an inlet side is at the left and, hereinafter, description will be given, assuming that the right side is the front side, and the left side is the rear side.

A fluid control apparatus (1) is used in a semiconductor manufacturing apparatus and the like and includes a pressure reducing valve (2) having a connection block portion (2a) at its lower end; a first block-shaped joint member (3) which supports the pressure reducing valve (2); a pressure indicator (4) which is arranged adjacent to the front side (the right side in the figure) of the pressure reducing valve (2) and has a connection block portion (4a) at its lower end; a second block-shaped joint member (5) which supports the pressure indicator (4); a first shut-off valve (6) which is arranged adjacent to the front side of the pressure indicator (5) and has a block-shaped joint portion (6a) formed integrally with its lower side at the same level as that of the joint members (3) and (5); a second shut-off valve (7) which is arranged adjacent to the front side of the first shut-off valve (6) and has a block-shaped joint portion (7a) which is formed integrally therewith to have a smaller height than that of the block-shaped joint portion (6a) in the first shut-off valve (6); a third block-shaped joint member (8) which has a lower surface at the same level as that of the lower surfaces of the joint members (3) and (5) and supports the second shut-off valve (7); a fourth block-shaped joint member (9) which is arranged adjacent to the front side of the block-shaped joint portion (7a) in the second shut-off valve (7); a fifth block-shaped joint member (10) which is arranged oppositely to the front side of the fourth joint member (9) with a predetermined interval interposed therebetween; a flow-rate adjustment device (11) which has connection block portions (11a) and (11b) at the rear side (the left side in the figure) and the front side, respectively, and, also, is supported such that it straddles the fourth and fifth joint members (9) and (10) by being supported at the rear connection block portion (11a) and the front connection block portion (11b) by the fourth joint member (9) and the fifth joint member (10), respectively; a third shut-off valve (12) which is arranged adjacent to the front side of the fifth joint member (10) and has a block-shaped joint portion (12a) which is formed integrally therewith to have a smaller height than that of the fifth joint member (10); and a sixth block-shaped joint member (13) which has a lower surface at the same level as that of the lower surfaces of the other joint members (3), (5), (8) and (9) and supports the third shut-off valve (12).

A process-gas introducing joint (14) for supplying a process gas to the pressure reducing valve (2) is connected to the first joint member (3). A purge-gas introducing joint (15) for supplying a purge gas to the second shut-off valve (7) is connected to the third joint member (8). A process-gas/purge-gas discharge joint (16) for discharging the process gas and the purge gas through the third shut-off valve (12) is connected to the sixth joint member (13).

In assembling the respective members (2), (3), (4), (5), (6), (7), (8), (9), (10), (11), (12) and (13), male screw members (18) in the frontward and rearward directions, as well as male screw members (17), (19) and (34) from above, are used and, also, the respective block-shaped joint members (3), (5), (8), (9), (10) and (13), the block-shaped joint portions (6a), (7a) and (12a) in the respective shut-off valves (6), (7) and (12), and the connection block portions (2a), (4a), (11a) and (11b) in the respective fluid control devices (2), (4) and (11) are abutted against one another with seal portions (seal means) (20) interposed thereamong.

The pressure reducing valve (2), the pressure indicator (4) and the joint members (3) and (5) corresponding thereto are connected to one another at fluid channels (23) and (24) therein at two positions spaced apart from each other in the front and rear direction by a predetermined interval. Further, corresponding thereto, two seal portions (20) spaced part from each other in the front and rear direction by a predetermined interval are provided among the pressure reducing valve (2), the pressure indicator (4) and the joint members (3) and (5).

As illustrated in FIG. 3, the joint members (3) and (5) are provided, in upper surfaces of front and rear end portions thereof, with female screws (32), and only a single male screw member from above (fluid-control-apparatus mounting male screw member) (17) is arranged outside of each seal portion (20) in the frontward and rearward directions. The seal portions (20) are provided substantially at the centers of the rectangular abutting surfaces of the joint members (3) and (5). The joint member (3) supporting the pressure reducing valve (2) has screw insertion holes (29) extending in a front and rear direction and female screws (30) extending in the front and rear direction which are alternately provided at four corners of the joint member (3). The joint member (5) supporting the pressure indicator (4) has screw insertion holes (29) extending in the front and rear direction and female screws (30) extending in the front and rear direction which are alternately provided at four corners of the joint member (5) at the positions opposite to those in the joint members (3) supporting the pressure reducing valve (2). Thus, the male screw members (18) in the front and rear direction are arranged at only two positions spaced apart from each other by 180 degrees, out of the four corners of the rectangular shape. The respective joint members (3) and (5) are provided, at their center portions in the front and rear direction, with a pair of screw insertion holes (33) extending in the upward and downward direction such that they are aligned laterally (in the widthwise direction) for inserting, therethrough, male screw members (joint-member mounting male screw members) (34) from above for securing the respective joint members (3) and (5) to a base member (31) made of an aluminum sheet metal.

The block-shaped joint portions (6a) and (7a) in the shut-off valves (6) and (7) adjacent to each other are coupled to each other and, further, the block-shaped joint portions (6a), (7a) and (12a) in the shut-off valves (6), (7) and (12) are coupled to the joint members (5), (9) and (10), in the same way as that of FIG. 3. This eliminates the necessity of arranging the fluid control devices so as to straddle joint members adjacent to each other, as in the related art, thereby increasing the assembling operation efficiency.

Figure 4:
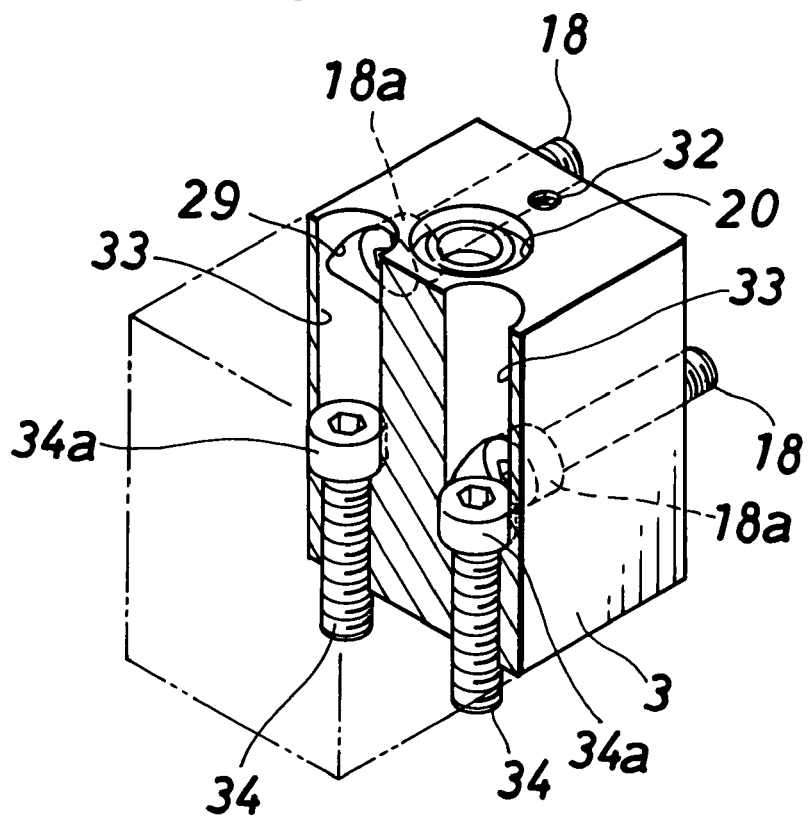
FIG. 4 is a partially-cutaway enlarged perspective view of the main parts of FIG. 3.
Figure 5:
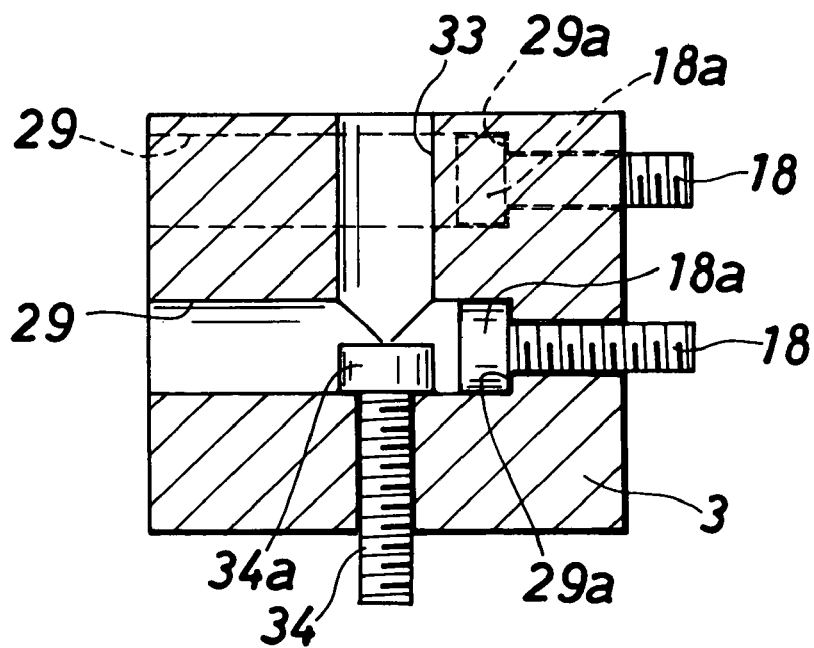
FIG. 5 is a cross-sectional view of the main parts of FIG. 3, taken along a front and rear direction.

As illustrated in FIGS. 4 and 5, the male screw members (18) in the front and rear direction and the male screw members (the joint-member mounting male screw members) (34) from above are prevented from interfering with each other in the following manner.

The screw insertion holes (29) extending in the front and rear direction in the respective joint members (3) and (5) have a stepped portion (29a) which receives the head portion (18a) of a male screw member (18) in the front and rear direction, and the stepped portion (29a) is positioned to be closer to the inserted tip end side (the front side) of the male screw member (18) in the front and rear direction than the position of the male screw members (34) from above in the front and rear direction (=the center portion in the front and rear direction). The male screw members (34) from above are received at their head portions (34a) by the lower surfaces of the screw insertion holes (29) extending in the front and rear direction. Accordingly, by fastening the male screw members (18) in the front and rear direction at first and then fastening the male screw members (34) from above, it is possible to prevent the male screw members (18) in the front and rear direction and the male screw members (34) from above from interfering with each other.

With the fluid control apparatus (1), it is possible to couple the pair of the joint members (3) and (5) to each other through the two male screw members (18) in the front and rear direction, thereby reducing the weight. Further, by fastening and detaching the two male screw members (18) in the front and rear direction, it is possible to easily increase and decrease the number of the joint members (3) and (5). Furthermore, it is possible to prevent the male screw members (18) in the front and rear direction and the male screw members (34) from above from interfering with each other, thereby further increasing the assembling operation efficiency.

INDUSTRIAL APPLICABILITY

The assembliability of a fluid control apparatus can be improved and, therefore, by applying the present invention to a fluid control apparatus used in a semiconductor manufacturing apparatus and the like, it is possible to contribute to an improvement in performance of the semiconductor manufacturing apparatus and the like.

The invention claimed is:

1. A fluid control apparatus comprising:
a plurality of fluid control devices arranged side by side in a front and rear direction;
a plurality of block-shaped joint members which are integrated with or separated from the fluid control devices; and
seal means for ensuring sealing property at a portion where the joint members are abutted against one another, wherein
each of the joint members is mounted to a base member through a male screw member from above, the joint members are abutted against one another and coupled to one another through a male screw member in the front and rear direction, a screw insertion hole extending in the front and rear direction has a stepped portion for receiving a head portion of the male screw member, and the stepped portion is provided closer to an inserted tip end of the male screw member in the front and rear direction than a position, in the front and rear direction, of the male screw members from above.

2. A method for assembling a fluid control apparatus including a plurality of fluid control devices arranged side by side in a front and rear direction, a plurality of block-shaped joint members which are integrated with or separated from the fluid control devices, and seal means for ensuring sealing property at a portion where the joint members are abutted against one another, the method comprising the steps of:
mounting each of the joint members to a base member through a male screw member from above; and
coupling the joint members abutted against one another through a male screw member in the front and rear direction; wherein
the male screw member in the front and rear direction is fastened at first, and then the male screw member from above is fastened, in order to prevent the male screw member in the front and rear direction and the male screw member from above from interfering with each other.

* * * * *